United States Patent [19]

White

[11] 4,224,012
[45] Sep. 23, 1980

[54] TIMING MECHANISM FOR WIND MOTORS

[76] Inventor: Herbert O. White, 4242 E. Wilshire, Phoenix, Ariz. 85008

[21] Appl. No.: 946,712

[22] Filed: Sep. 28, 1978

[51] Int. Cl.$^3$ ............................................. F03D 3/06
[52] U.S. Cl. .................................. 416/117; 74/571 M
[58] Field of Search ...................... 416/117, 118, 145; 74/568 R, 571 L, 600

[56] References Cited

U.S. PATENT DOCUMENTS

| | | | |
|---|---|---|---|
| 1,744,924 | 1/1930 | Sargent | 416/111 X |
| 2,437,346 | 3/1948 | Bourne | 416/117 X |
| 3,234,816 | 2/1966 | Von Thuengen | 74/571 |
| 3,399,582 | 9/1968 | Henry | 74/571 |
| 4,097,190 | 6/1978 | White | 416/117 |

Primary Examiner—Everette A. Powell, Jr.
Attorney, Agent, or Firm—Don J. Flickinger

[57] ABSTRACT

A plate is carried by the blade support shaft journalled within the frame of a wind motor. The axle shaft of the blade is securable to the plate at variable distances relative the support shaft to selectively vary the offset of the blade. A primary drive element, gear or sprocket, coaxial with the axle shaft and rotatable in response to rotation of the blade, drivingly engages a driven idler element, gear or sprocket, respectively, carried by an idler shaft journalled within the plate. A planetary gear rotatable in response to the driven idler element, drivingly engages a sun gear fixed to the frame coaxial with the support shaft.

8 Claims, 8 Drawing Figures

TIMING MECHANISM FOR WIND MOTORS

This invention relates to wind motors.

More particularly, the present invention relates to wind motors of the type having a cyclically feathering wind propelled blade rotatable about an offset axis.

In a further aspect, the instant invention concerns improved timing mechanism for selectively varying the offset of the blade.

Impeller-type wind motors having cyclically feathering wind gathering elements, alternately referred to as blades, vanes, fans and sails, are well known. Briefly, the devices commonly include a stationary frame which may be adjustable about a vertical axis for favorable orientation to the prevailing wind. A main blade support shaft, having a crank arm extending perpendicularly therefrom, is rotatably journalled within the frame. An axle shaft, extending from the axis of rotation of the blade, is rotatably received within the crank arm.

As the crank arm rotates, the blade rotates about the axle shaft between a working position and a feathered position. During the working position, the blade receives the force of the wind generally perpendicular to the side thereof to urge rotation of the crank arm. Subsequently, during the feathered position, the edge of the blade is presented to the wind as the blade moves against the wind. The blade is cycled in response to a timing mechanism, generally interacting between the blade and the frame.

The prior art is replete with various specific configurations of impeller-type wind motors, having one or several blades, which embody the structure generally set forth above. The prior art is exemplified by the following issued United States patents:

| | |
|---|---|
| 180,603 Leach | 1,086,611 Paddock |
| 662,944 Jones | 1,560,024 Dennhardt |
| 705,397 Graham | 1,786,057 Fales |
| 749,806 Rue | 1,812,814 Lammeren |
| 759,238 Chaquette | 2,437,346 Bourne |
| 767,346 Sharp | 3,810,712 Hillman |
| 866,836 Bell | |

Typical wind motors are also disclosed in the following foreign patents:

| | |
|---|---|
| 963,229 Germany | 47,122 Sweden |
| 1,076,588 Germany | 865,280 Germany |

Attention is also directed to the present inventor's U.S. Pat. No. 4,097,190 issued 27 June 1978, and entitled "Wind Motor."

The distance from the axis of rotation of a crank arm to the point of power input to the crank arm is commonly referred to as "offset." It is well known that the factors of speed, torque, and balance of a motor or engine are directly related to offset. Consider the familiar auto cycle engine as commonly used to power various machinery and propel vehicles. All other factors being equal, the greater the offset the greater the low speed torque produced. On the other hand, an engine having a relatively small offset is generally capable of higher speeds and greater horsepower. As offset increases, balance becomes more critical since the moving mass is displaced farther from the axis of rotation.

U.S. Pat. No. 4,097,190 states, in part: " . . . speed and torque multiplication factors are readily achieved by variance of the length of the crank arm." The statement is generally applicable to the devices disclosed in the other referenced patents. However, the length of the crank arm in each case is pre-determined at time of manufacture, thereby denying the user the ability to adjust the offset for optimum operation with a given piece of equipment or under prevailing wind conditions.

The patents cited illustrate over 100 years of the development of the art, yet this exceedingly important feature has either been neglected or defied solution.

It would be highly advantageous, therefore, to remedy the shortcomings associated with the prior art.

Accordingly, it is an object of the present invention to provide improved timing mechanism for wind motors.

Another object of the invention is the provision of improved timing mechanism, including means for varying the offset of the blade.

And another object of the invention is to provide means whereby the offset can be adjusted by the user to accommodate immediate operating conditions.

Still another object of this invention is the provision of an improved timing mechanism which is adaptable to pre-existing wind motors of conventional design.

Yet another object of the invention is to provide an improved timing mechanism which is readily and conveniently adjusted with conventional skills and tools.

Yet still another object of the present invention, in accordance with an embodiment thereof, is the provision of means whereby the offset is adjustable by pre-determined increments.

A further object of the invention, in accordance with another embodiment thereof, is to provide means whereby the offset is infinitely adjustable.

And a further object of the invention is the provision of means whereby the offset of the blade can be adjusted without the necessity of other modifications or alterations to the wind motor.

Still a further object of the instant invention is to provide an improved timing mechanism which can be coupled by gear, chain or belt drive means.

And still a further object of the instant invention is the provision of an improved timing mechanism having offset adjustable features as above which is relatively inexpensive to manufacture and yet is substantially durable and maintenance free.

Briefly to achieve the desired objects of the instant invention in accordance with a preferred embodiment thereof, first provided is a support member which is carried by the blade support shaft instead of the conventional crank arm. Blade support means are carried by the support member for rotation of the blade about an axis parallel to the blade support shaft. Next provided are adjustment means for selectively varying the distance between the axis of rotation of the blade and the blade support shaft. The timing means maintain a pre-determined ratio between the speed of rotation of the blade and speed of rotation of the support member.

In accordance with a more specific embodiment of the invention, the support member is in the form of a plate which is perpendicular to the blade support shaft. The blade support means includes an axle shaft coincident with the axis of rotation of the blade. The adjustment means includes a plurality of apertures or an elongate slot for receiving the axle shaft at various locations. The orientation of the plurality of apertures or the slot represents variable distances from the blade support shaft.

The timing means includes an idler shaft journalled within the support plate. A driven idler element, gear, sprocket or pulley, is fixed to the idler shaft and in driving engagement with a complimentary primary drive element rotatable in response to rotation of the blade. A planetary idler belt, carried by the idler shaft and rotatable in response to the driven idler element, is in driving engagement with a sun element stationarily carried by the frame coaxial with the blade support shaft.

Further and more specific objects and advantages of the instant invention will become readily apparent to those skilled in the art from the following detailed description and preferred embodiments thereof, taken in conjunction with the drawings, in which.

Figure 1:
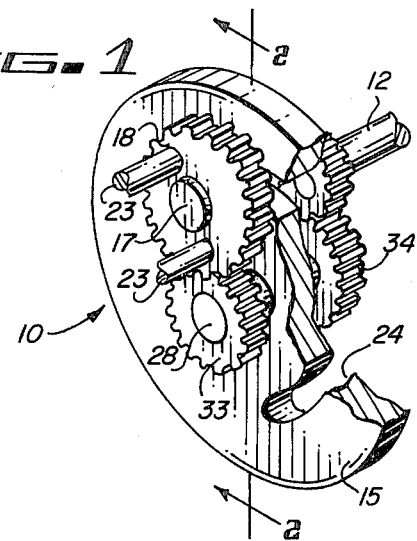
FIG. 1 is a perspective view, partly broken away, of an improved timing mechanism embodying the principles of the instant invention.
Figure 2:
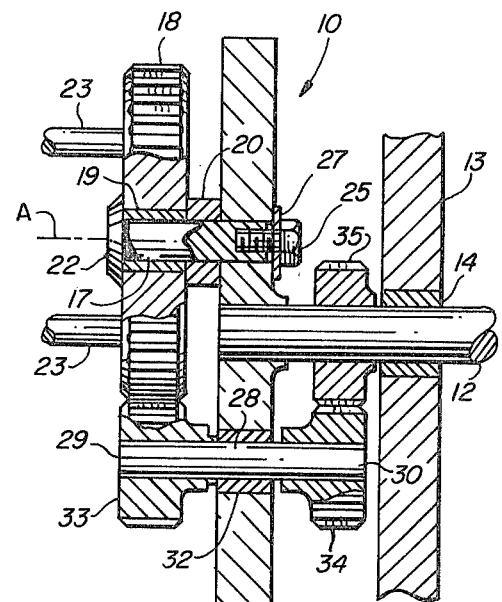
FIG. 2 is an enlarged vertical sectional view taken along the line 2—2 of FIG. 1.

Turning now to the drawings in which like reference characters indicate corresponding elements throughout the several views, attention is first directed to FIGS. 1 and 2 which show improved timing mechanism embodiment according to the instant invention generally designated by the reference character 10. The environment for improved timing mechanism 10 is not illustrated in the immediate drawings. For orientation, attention is directed to FIG. 2 of U.S. Pat. No. 4,097,190 which illustrates "intermediate shaft 53" rotatably journalled in "stationary frame member 50 . . . by bearing 54". Correspondingly, FIG. 2 of the instant case shows blade support shaft 12 rotatably journalled in frame 13 by bearing 14.

Blade support shaft 12 is the primary support means for timing mechanism 10 and the associated wind blade. Additionally, blade support shaft 12 may function as the power output shaft of the wind motor, or alternately, function as an intermediate shaft rotating in response to movement of the wind blade and drivingly engaged with a separate power output shaft. Further blade support shaft may be coupled with similar blade support shafts in a multi-blade wind motor.

Plate 15 secured to blade support shaft 12 by any conventional means, such as key, bolt, press-fit, or welding, functions as a support member for carrying several of the components of the improved timing mechanism and for carrying the wind blade. The direct blade support means includes stud 17 on which is rotatably journalled primary drive gear 18 by means of bearing 19. Primary drive gear 18 is captive between sleeve 20 which spaces primary gear 18 from plate 15 and stud-head 22. Posts 23 extending from primary drive gear 18 are affixed at the respective free ends to the wind blade. While the respective free ends of posts 23 are not specifically herein illustrated, the attachment thereof to a wind blade is well established in the art. Preferably posts 23 are diametrically spaced with respect to stud 17. Accordingly, the axis of rotation of the wind blade is coincident with the axis of rotation of primary gear 18 and the longitudinal axis of stud 17 as indicated by the broken line "A".

Stud 17 is received in elongate slot 24 within plate 15 and secured thereto by bolt and washer 25 and 27, respectively. For this purpose a threaded hole is formed into stud 17. Slot 24 comprises an element of the adjustment means for selectively varying the offset of the blade, which adjustment means will be presently described in detail.

As will be recognized by those skilled in the art, the speed of rotation of the blade about axis "A" varies from the speed of rotation of shaft 12. The differential speeds of rotation are necessary to obtain cyclic feathering of the blade. Generally the blade rotates twice for each rotation of shaft 12.

Timing means associated with timing mechanism 10 includes idler shaft 28 having first and second ends 29 and 30, respectively, and journalled within plate 15 by bearing 32. Driven idler gear 33 and planetary idler gear 34 are affixed to idler shaft 28, on opposite sides of plate 15 proximate ends 29 and 30, respectively, by conventional means. Sun gear 35 is affixed to frame 13 coaxial with support shaft 12.

Primary gear 18, being secured to the blade by posts 23, rotates in response to rotation of the blade. Driven idler gear 33 is in driving engagement with primary gear 18. Planetary gear 34 is in driving engagement with sun gear 35. As plate 15 and shaft 12 rotate, planetary gear 34 rotates about sun gear 35. In accordance with the immediate embodiment, planetary gear 34 has the same diameter as sun gear 35. The ratio between the speed of rotation of the blade about axis "A" and the speed of rotation of shaft 12 is achieved by the ratio of the diameter of primary drive gear 18 to driven idler gear 33 which, as illustrated, is two to one.

Figure 3:
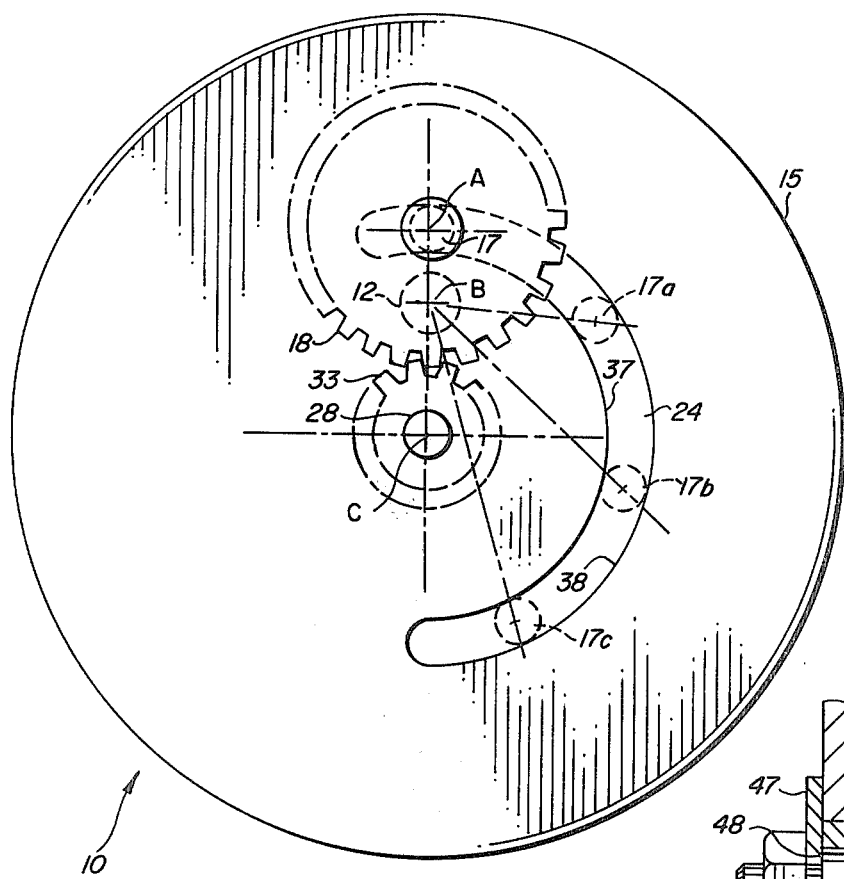
FIG. 3 is a semi-schematic front elevation view of the device of FIG. 1, especially illustrating the function thereof.

Adjustment means for selectively varying the offset of the blade is best described in connection with FIG. 3. The offset is defined as the distance between the axis of rotation of the blade, seen as point "A" in FIG. 3, and the axis of rotation of blade support shaft 12, seen as point "B". Elongate slot 24 is arcuate and concentric with idler shaft 28. That is, the inner and outer walls 37 and 38, respectively, of slot 24 are semicircular, the radii of which extend from the axis of rotation of idler shaft 28, as designated by the reference character "C". Stud 17 is movable within slot 24 and securable by means of washer 27 and bolt 25 at infinite positions. Representative positions are indicated by the broken outline representation of stud 17, designated 17A, 17B and 17C. It is noted that as stud 17 moves from the illustrated position through positions 17A, 17B and 17C to the terminal position, 180° from the illustrated position, the distance between axes "A" and "B", the offset, progressively increases.

An important feature of the immediate embodiment is the fact that the offset can be readily and conveniently altered without modification or other adjustments of the wind motor. In this respect it is noted that as stud 17 moves in slot 24, the distance between axes "A" and "C" remains constant. Accordingly, the offset is selectively variable by simply loosening bolt 25, move stud 17 to the selected position, and re-tighten bolt 25.

Figure 4:
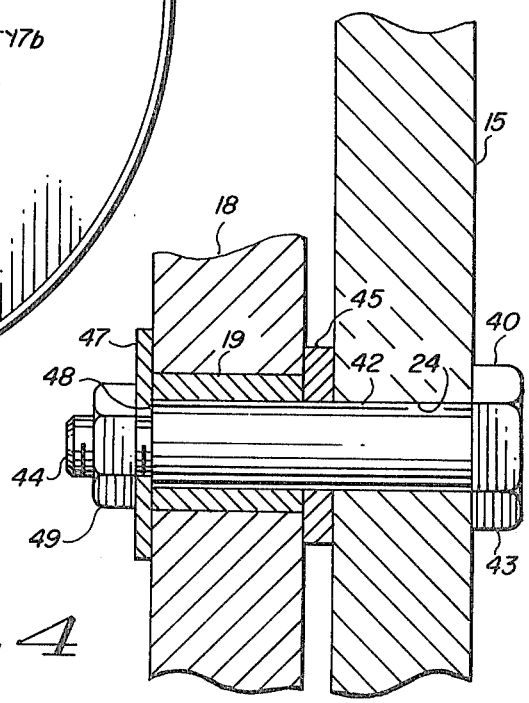
FIG. 4 is an enlarged fragmentary vertical sectional view, generally taken from the illustration of FIG. 2, and showing an alternate embodiment thereof.

FIG. 4 illustrates alternate structure for rotatably attaching gear 18 to plate 15. Shoulder bolt 40 having shank 42, head 43 and threaded section 44 is passed through slot 24 with head 43 abutting plate 15. Thrust washer 45 and bearing 19 are carried on shank 42, with thrust washer 45 disposed between plate 15 and gear 18. Second thrust washer 47 is secured against shoulder 48 by nut 49. In other respects, the embodiment of FIG. 4 is analogous to the embodiment described in detail in connection with FIGS. 1-3.

Figure 6:
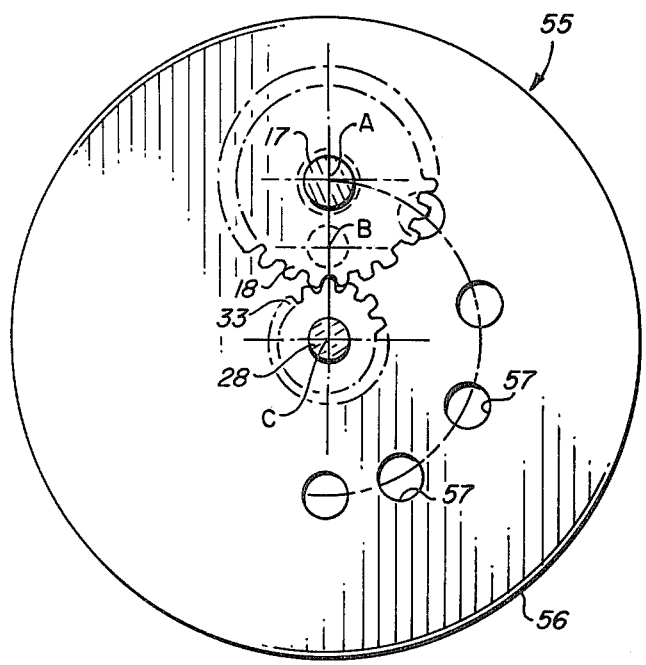
FIG. 6 is a semi-schematic front view of the embodiment of FIG. 5, and especially useful for explaining the function thereof.
Figure 5:
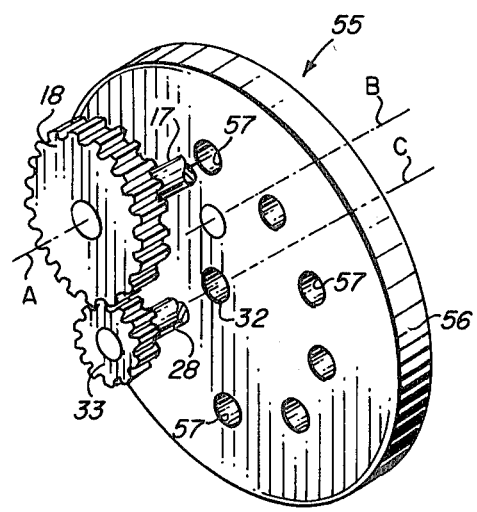
FIG. 5 is an exploded partial perspective view of an alternate embodiment of the instant invention generally corresponding to the embodiment depicted in FIG. 1.

Illustrated in FIGS. 5 and 6 is another embodiment of the instant invention generally designated by the reference character 55. Generally similar to the embodiment previously described in connection with FIGS. 1 and 2, the immediate embodiment includes primary drive gear 18 supported by stud 17 and driven idler gear 33 supported by idler shaft 28. Although not specifically illustrated, the immediate embodiment further includes planetary gear 34 and sun gear 35 which are arranged and function as previously described.

The immediate embodiment 55 of the instant invention incorporates a modified plate 56 which is secured to shaft 12 and carries bearing 32 as previously described. Instead of arcuate slot 24, plate 56 has a plurality of apertures 57 therethrough. Each aperture 57 is sized and shaped to receive stud 17 for the purpose of rotatably affixing the blade and gear 18.

The several apertures 57 are at varying distances from axis "B" of shaft 12 yet, each aperture 57 is equally spaced from axis "C" of idler shaft 28. Accordingly, stud 17 can be entered through any aperture 17 to selectively vary the offset of the blade while maintaining driving engagement between gears 18 and 33 without other alteration or modification of the improved timing mechanism.

Figure 8:
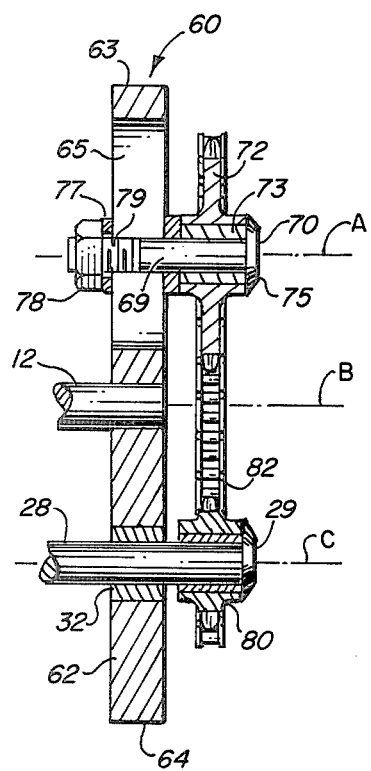
FIG. 8 is a vertical sectional view taken along the line 8—8 of FIG. 7.
Figure 7:
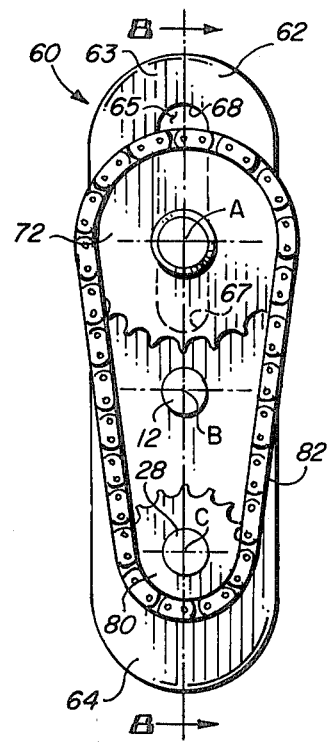
FIG. 7 is a front elevation view of another improved timing mechanism constructed in accordance with the teachings of the instant invention.

Turning now to FIGS. 7 and 8, there is seen an alternate embodiment of the instant invention, generally designated by the reference character 60, including a support member in the form of crank arm 62 having first end 63 and second end 64. Intermediate ends 63 and 64, crank arm 62 is secured to blade support shaft 12 by method and for reasons as previously described in connection with plate 15.

Elongate slot 65 extends along a line radial from axis "B" having first end 67 near shaft 12 and second end 68 near first end 63 of arm 62. Shank 69 of stud 70 extends through and is slideable within slot 65. Chain drive sprocket 72 is rotatably journalled on shank 69 by bearing 73. Thrust washer 74 resides between chain drive sprocket 72 and crank arm 62. Stud head 75 retains chain drive sprocket 72 on shank 69. Stud 70 being movable along slot 65 is retained at a selected position by washer 77 and nut 78, the latter being threaddedly engaged with external thread section 79 carried on shank 69.

Idler shaft 28, as previously described, is journalled within crank arm 62 by bearing 32. Driven chain sprocket 80 is secured to idler shaft 28 proximate first end 29. Endless chain 82 drivingly engages sprockets 72 and 80. Although not specifically illustrated in the immediate views, planetary idler gear 34 is secured to idler shaft 28 and drivingly engages sun gear 35 affixed to frame 13, as previously described in connection with FIG. 2.

The function and result of embodiment 60 is analogous to the function previously described in connection with the embodiment designated 10. In response to movement of stud 70 within slot 65, the distance between axis "A" and axis "B" is altered. Accordingly, the offset of the blade, rotating about axis "A", is variable with selective placement of stud 70. The length of endless chain 82 must be altered to accommodate various placement of drive sprocket 72. This is readily accomplished by the use of well-known and commercially available removable links, which may be added or removed as necessary.

Various changes and modifications to the embodiments herein chosen for purposes of illustration will readily occur to those skilled in the art. For example, in connection with the embodiments of FIGS. 7 and 8, in general analogy to the embodiments of FIGS. 5 and 6, a plurality of apertures could be spaced along the radial line instead of slot 65. Each aperture would receive shank 69 at a selective location. The spacing of the apertures may correspond to an incremental change in the length of endless chain 82 by the insertion or deletion of a given number of removable links. The embodiment of FIGS. 7 and 8 further suggests the use of appropriate pulleys and V-belt to replace sprockets 72 and 80 and chain 82. Other modifications and variations to the devices herein chosen for purposes of illustration will readily occur to those skilled in the art. To the extent that such modifications and variations do not depart from the spirit of the invention, they are intended to be included within the scope thereof which is limited only by a fair interpretation of the following claims.

Having fully described and disclosed the present invention, and alternate embodiments thereof, in such clear and concise terms as to enable those skilled in the art to understand and practice same, the invention claimed is:

1. An improved timing mechanism especially adapted for use with a wind motor, which wind motor includes a frame and a wind driven blade movable relative to said frame, and for selectively adjusting the offset of said blade, said improved timing mechanism comprising:
    (a) a blade support axle shaft having a blade support axle axis of rotation carried by said frame;
    (b) a support member carried by said blade support axle shaft and rotatable relative to said frame;
    (c) blade support means carried by said support member for rotation of said blade about a blade axis of rotation, said blade support axis of rotation and said blade axis of rotation being substantially parallel to each other;
    (d) timing means for maintaining a predetermined ratio between the speed of rotation of said wind driven blade and the speed of rotation of said support member;
    (e) adjustment means, including socket means formed on said support member for receiving said blade axle shaft at selectively variable locations relative to said axis of rotation of the blade support shaft; and
    (f) means for securing said blade axle shaft at any one of said variable locations.

2. The improved timing mechanism of claim 1, wherein said timing means includes:

(a) a primary drive element rotatable in response to rotation of said blade;

(b) an idler shaft having an idler shaft axis of rotation carried by said support member in spaced parallel relationship to blade support axle shaft so that said idler shaft axis of rotation and the axis of rotation of the blade support shaft are parallel;

(c) a driven idler element carried by said idler shaft and in driving engagement with said primary drive element;

(d) a planetary idler element carried by said idler shaft and rotatable in response to said driven idler element; and (e) a sun element stationarily carried by said frame coaxially with said blade support axle shaft, and in driving engagement with said planetary idler.

3. The improved timing mechanism of claim 2, wherein said socket means is in the form of an elongate slot extending radially from said main shaft.

4. The improved timing mechanism of claim 2, wherein said socket means includes a plurality of apertures within said support member and spaced along a line radial to said main shaft.

5. The improved timing mechanism of claim 3 or 4, wherein:

(a) said primary drive element is in the form of a drive sprocket coaxially carried by said blade support shaft; and (b) said driven idler element is in the form of a driven sprocket coaxially carried by said idler shaft, said primary drive element being drivingly engaged with said driven idler element by an endless chain.

6. The improved timing mechanism of claim 2, wherein said socket means is in the form of an elongate arcuate slot concentric with said idler shaft.

7. The improved timing mechanism of claim 2, wherein said socket means includes a plurality of apertures, each of said plurality of apertures being spaced equidistant from said idler shaft.

8. The improved timing mechanism of claim 6 or 7, wherein:

(a) said primary drive element is in the form of a drive gear coaxially carried by said blade support shaft; and (b) said driven idler element is in the form of a driven gear coaxially carried by said idler shaft, said drive gear being maintained in driving engagement with said driven gear as said blade support shaft is positioned at said variable locations of said socket means.

* * * * *